(12) United States Patent
Michaloski

(10) Patent No.: US 7,248,769 B2
(45) Date of Patent: Jul. 24, 2007

(54) OPTICAL FIBER BUNDLES AND DEVICES INCLUDING THEM

(75) Inventor: Paul Francis Michaloski, Rochester, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/298,844

(22) Filed: Dec. 8, 2005

(65) Prior Publication Data

US 2006/0140558 A1    Jun. 29, 2006

Related U.S. Application Data

(60) Provisional application No. 60/640,730, filed on Dec. 29, 2004.

(51) Int. Cl.
*G02B 6/04* (2006.01)
*G02B 6/024* (2006.01)

(52) U.S. Cl. ............................................. 385/115
(58) Field of Classification Search .................. None
See application file for complete search history.

(56) References Cited

U.S. PATENT DOCUMENTS

| | | | |
|---|---|---|---|
| 4,932,747 A | * | 6/1990 | Russell et al. ............. 385/115 |
| 5,715,345 A | * | 2/1998 | McKinley .................. 385/115 |
| 6,542,681 B2 | | 4/2003 | Broeng et al. |
| 6,788,865 B2 | | 9/2004 | Kawanishi et al. |
| 6,917,741 B2 | | 7/2005 | Fekety ........................ 385/125 |
| 2004/0161213 A1 | * | 8/2004 | Lee .............................. 385/120 |
| 2004/0258381 A1 | | 12/2004 | Borrelli ........................ 398/79 |

FOREIGN PATENT DOCUMENTS

JP        2000-66054 A    *  3/2000

* cited by examiner

*Primary Examiner*—Rodney Bovernick
*Assistant Examiner*—Mike Stahl
(74) *Attorney, Agent, or Firm*—Timothy M. Schaeberle

(57) ABSTRACT

The present invention provides optical fiber bundles that can be configured to yield beams of radiation having tailored polarization and/or intensity properties. According to one embodiment of the invention, an optical fiber bundle includes a plurality of polarization-maintaining optical fibers, each of the polarization-maintaining optical fibers having an input end, an output end, an interior portion connecting the input end to the output end, and a polarization axis, wherein the input ends of the polarization-maintaining optical fibers are grouped in a first arrangement, and the output ends of the polarization-maintaining optical fibers are grouped in a second arrangement, and wherein the relative orientations of the polarization axes in the first arrangement is different than the relative orientation of the polarization axes in the second arrangement.

17 Claims, 6 Drawing Sheets

OPTICAL FIBER BUNDLES AND DEVICES INCLUDING THEM

CROSS-REFERENCE TO RELATED APPLICATION

The present application claims priority to U.S. Provisional Patent Application Ser. No. 60/640,730 filed on Dec. 29, 2004, entitled "OPTICAL FIBER BUNDLES AND DEVICES INCLUDING THEM," under 35 U.S.C. § 119, the content of which is relied upon and hereby incorporated by reference in its entirety.

BACKGROUND OF THE INVENTION

1. Field of the Invention

The present invention relates generally to the transportation of radiation, and more specifically to the use of optical fiber bundles in the transportation of radiation.

2. Technical Background

Ultraviolet radiation finds wide application a diverse array of technologies. For example, the semiconductor industry uses ultraviolet radiation in photolithographic processes to define the conductive paths in integrated circuits. The lower limit of feature size is directly related to the wavelength of the radiation; hence, to form smaller features, it is desirable to use shorter wavelength radiation. Likewise, in metrology applications it is desirable to use radiation having as short a wavelength as possible to maximize resolution. Ultraviolet radiation also finds use in medical and industrial applications.

While ultraviolet radiation is extremely useful, there exist few workable methods to transport it from one location (i.e. the source) to another (i.e. an instrument or a workpiece). Lenses and mirrors may be used to reflect and focus the radiation; such apparati are difficult to align, sensitive to vibrations, require highly specialized and expensive materials, and may cause exposure of personnel to the radiation. Better methods for transporting ultraviolet radiation are needed in the art.

In ultraviolet photolithography applications, the polarization of the beam as it strikes the wafer can have an effect on the image contrast and the smallest obtainable feature size. Desirably, the ultraviolet radiation strikes the wafer with its electric field vector parallel to the wafer surface so that interference occurs in the plane of the wafer. In low-NA imaging applications, the polarization of the beam is relatively unimportant; because the beam strikes the wafer at substantially normal incidence, any beam polarization will have its electric field vector parallel to the wafer. In high-NA imaging applications, such as are used in state-of-the-art microlithography systems used to make microelectronic devices, radiation can strike the wafer at a relatively oblique angle. At higher angles, the polarization of the ultraviolet radiation becomes important. See, for example, B. W. Smith et al., "Benefiting from polarization—effects on high NA imaging," Proc. SPIE, vol. 5377, pp 68-79, which is incorporated herein by reference in its entirety. As such, a desirable device would provide ultraviolet radiation with a tailorable polarization distribution. Further, the excimer lasers often used in ultraviolet photolithography, while having high power at low wavelengths, tend to produce an asymmetric beam with many 'hot spots.' A desirable device would also provide ultraviolet radiation having a tailorable intensity distribution.

SUMMARY OF THE INVENTION

One embodiment of the present invention relates to an optical fiber bundle including a plurality of polarization-maintaining ultraviolet transmitting optical fibers, each of the polarization-maintaining ultraviolet transmitting optical fibers having an input end, an output end, an interior portion connecting the input end to the output end, and a polarization axis, wherein the input ends of the polarization-maintaining ultraviolet transmitting optical fibers are grouped in a first arrangement, and the output ends of the polarization-maintaining ultraviolet transmitting optical fibers are grouped in a second arrangement, and are arranged with respect to the input ends of the polarization-maintaining ultraviolet transmitting optical fibers so that when a plane polarized beam is input to the fiber bundle at the input ends of the polarization-maintaining ultraviolet transmitting optical fibers, it is output from the output ends the polarization-maintaining ultraviolet transmitting optical fibers as a substantially azimuthally polarized beam.

Another embodiment of the present invention relates to an optical fiber bundle including a plurality of polarization-maintaining optical fibers, each of the polarization-maintaining optical fibers having an input end, an output end, an interior portion connecting the input end to the output end, and a polarization axis, wherein the input ends of the polarization-maintaining optical fibers are grouped in a first arrangement, and the output ends of the polarization-maintaining optical fibers are grouped in a second arrangement, and wherein the relative orientations of the polarization axes in the first arrangement is different than the relative orientation of the polarization axes in the second arrangement.

Another embodiment of the present invention relates to an ultraviolet beam delivery unit including a source of a substantially asymmetric and non-uniform in intensity beam of ultraviolet radiation; and a bundle including a plurality of ultraviolet transmitting optical fibers, each of the ultraviolet transmitting optical fibers having an input end, an output end, an interior portion connecting the input end to the output end, wherein the input ends of the ultraviolet transmitting optical fibers are coupled to the source of the beam of polarized ultraviolet radiation; and wherein the ultraviolet transmitting optical fibers are routed within the bundle so that when a beam having an input intensity profile is input to the optical fiber bundle, the optical fiber bundle outputs a beam having an output intensity profile different than the input intensity profile.

The devices and methods of the present invention result in a number of advantages over prior art devices and methods. For example, the optical fiber bundles of the present invention can be tailored to provide an output having desirable polarization and/or intensity distribution from an input beam having less desirable properties. A beam having an azimuthal polarization distribution can be created by the optical fiber bundles of the present invention; even when used in a high-NA imaging system, such a beam can strike a substrate with its electric field vector parallel to the substrate surface.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention, and together with the description serve to explain the principles and operation of the invention.

DETAILED DESCRIPTION OF THE PREFERRED EMBODIMENTS

Figure 1:
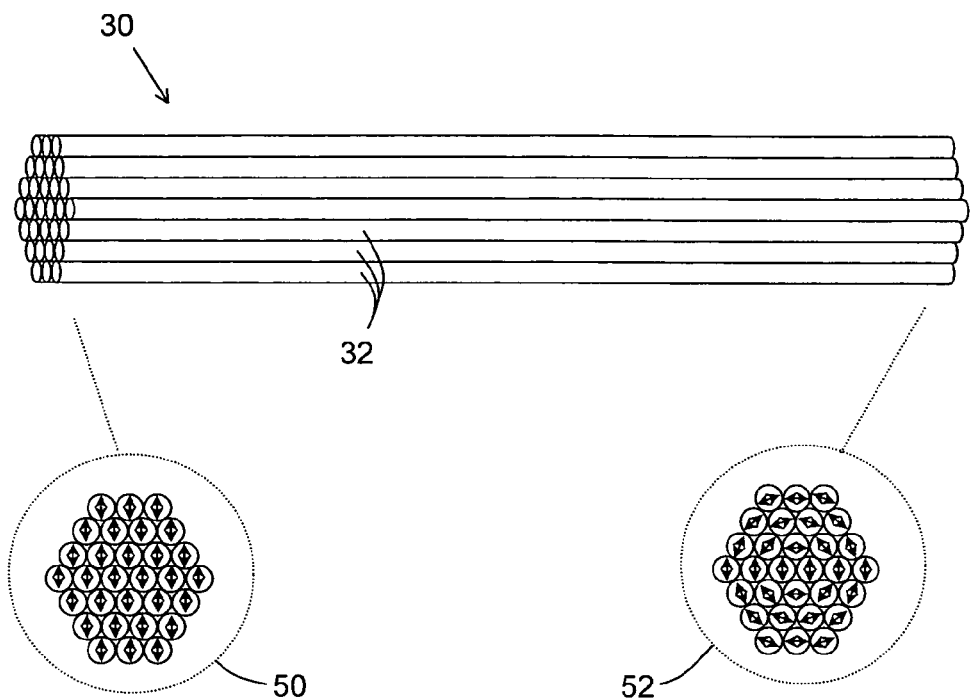
FIG. 1 is a side schematic view of an optical fiber bundle according to one embodiment of the present invention.
Figure 2:
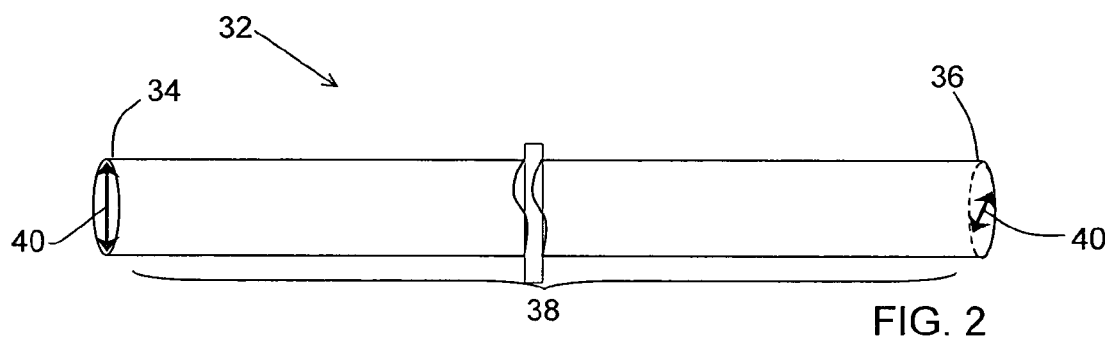
FIG. 2 is a side schematic view of a polarization-maintaining ultraviolet transmitting optical fiber suitable for use in the present invention.
Figure 3:
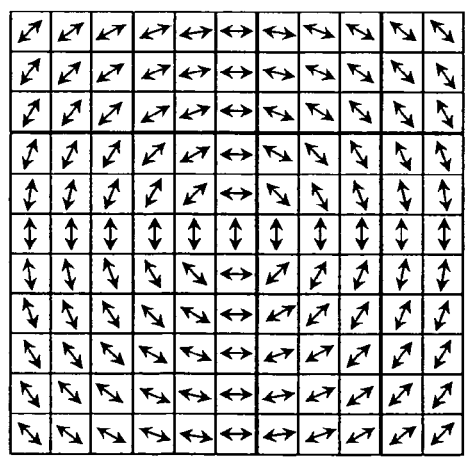
FIG. 3 is a cross-sectional polarization map of a substantially azimuthally polarized beam.

The present invention relates generally to optical fiber bundles that provide radiation having a tailored polarization and/or intensity distribution. FIG. 1 is a side schematic view of a bundle according to one embodiment of the present invention. Bundle 30 includes a plurality of polarization-maintaining ultraviolet transmitting optical fibers 32. As shown in FIG. 2, each polarization-maintaining ultraviolet transmitting optical fiber 32 has an input end 34, an output end 36, and an interior portion 38 connecting the input end to the output end. Each polarization-maintaining ultraviolet transmitting optical fiber 32 also has a polarization axis 40. Returning to FIG. 1, the input ends 34 are grouped in a first arrangement, and the output ends 36 are arranged in a second arrangement. The output ends 36 of each of the polarization-maintaining ultraviolet transmitting optical fibers 32 is arranged with respect to its corresponding input end 36 so that when a plane polarized beam is input to the fiber bundle at the input ends of the polarization-maintaining ultraviolet transmitting optical fibers, it is output from the output ends the polarization-maintaining ultraviolet transmitting optical fibers as a substantially azimuthally polarized beam. A cross-sectional polarization map of a substantially azimuthally polarized beam is shown in FIG. 3; the beam propagates normal to the plane of the page, and the arrows denote the direction of the electric field vectors. In one example of arrangement of the input and output ends of the polarization-maintaining ultraviolet transmitting optical fibers, shown in FIG. 1, the input ends of the polarization-maintaining ultraviolet transmitting optical fibers are arranged so that their polarization axes at their input ends are substantially parallel to one another (shown in inset 50), and the output ends of polarization-maintaining ultraviolet transmitting optical fibers are arranged so that their polarization axes at their output ends are arranged azimuthally (shown in inset 52).

According to one embodiment of the invention, the polarization-maintaining ultraviolet transmitting optical fibers are polarization-maintaining photonic band gap fibers having a core region and a photonic band gap structure surrounding the core region. Photonic band gap fibers guide light by a mechanism that is fundamentally different from the total internal reflection mechanism typically used in conventional optical fibers. Photonic band gap fibers have a photonic band gap structure formed in the cladding of the fiber. The photonic band gap structure may be, for example, a periodic array of holes having a spacing on the order of the wavelength of light. The photonic band gap structure has ranges of frequencies and propagation constants, known as band gaps, for which light is forbidden from propagating in the photonic band gap structure. The core region of the fiber is formed by a defect in the photonic band gap structure cladding. For example, the defect may be a hole of a substantially different size and/or shape than the holes of the photonic band gap structure. Alternatively, the defect may be a solid structure embedded within the photonic band gap structure. Light introduced into the core will have a propagation constant determined by the frequency of the light and the structure of the core. Light propagating in the core of the fiber having a frequency and propagation constant within a band gap of the photonic band gap structure will not propagate in the photonic band gap cladding, and will therefore be confined to the core. A photonic band gap fiber may have a core region that is formed from a hole larger than those of the surrounding photonic band gap structure; such a core region is said to be a hollow core region. In such a hollow-core fiber, the light may be guided substantially within the hollow core region.

Photonic band gap fibers suitable for use in the present invention are described, for example, in U.S. patent application Ser. No. 10/857,082, entitled "METHODS OF GENERATING AND TRANSPORTING SHORT WAVELENGTH RADATION AND APPARATI USED THEREIN," filed May 27, 2004; U.S. patent application Ser. No. 10/298,374, entitled "METHODS FOR MANUFACTURING MICROSTRUCTURED OPTICAL FIBERS WITH ARBITRARY CORE SIZE," filed Nov. 18, 2002; U.S. Pat. No. 6,788,865, entitled "POLARIZATION MAINTAINING OPTICAL FIBER WITH IMPROVED POLARIZATION MAINTAINING PROPERTY," issued Sep. 7, 2004; and U.S. Pat. No. 6,542,681, entitled "POLARIZATION PRESERVING OPTICAL FIBRE," issued Apr. 1, 2003, each of which is hereby incorporated herein by reference. The skilled artisan will select a photonic band gap structure and core structure to give the desired polarization-maintaining and ultraviolet transmitting properties in accordance with the above-listed references.

While the optical fiber bundle 30 of FIG. 1 is shown as having a hexagonal geometry, the skilled artisan will recognize that the bundle may have any desired geometry (e.g., round, oblong, linear, triangular, parallelepiped).

Figure 4:
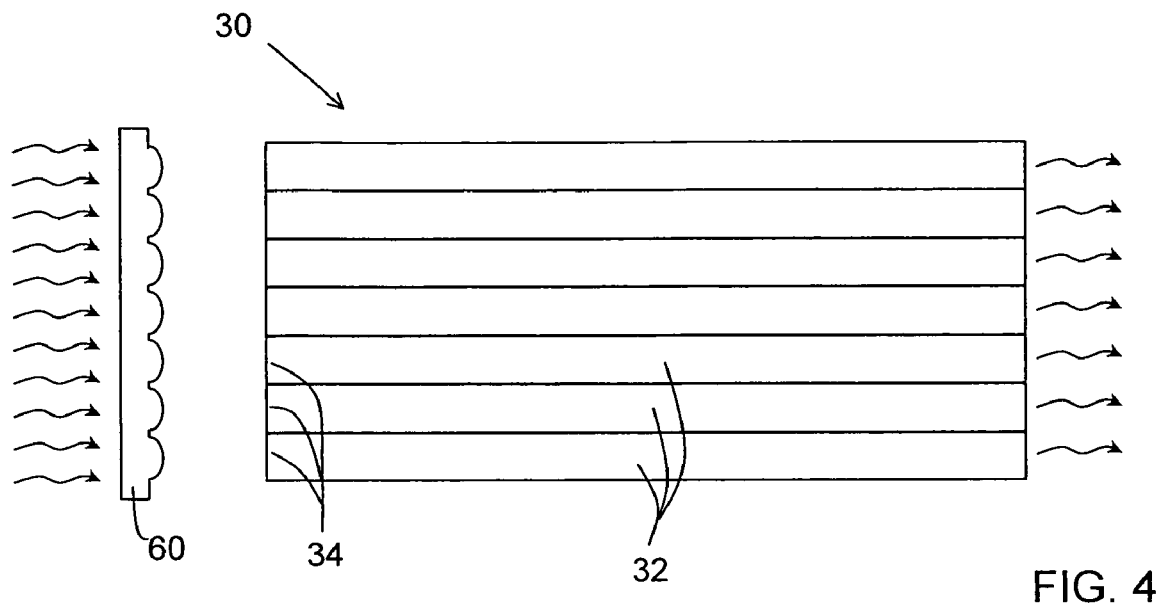
FIG. 4 is a side schematic view of an optical fiber bundle including a lens array according to another embodiment of the present invention.
Figure 5:
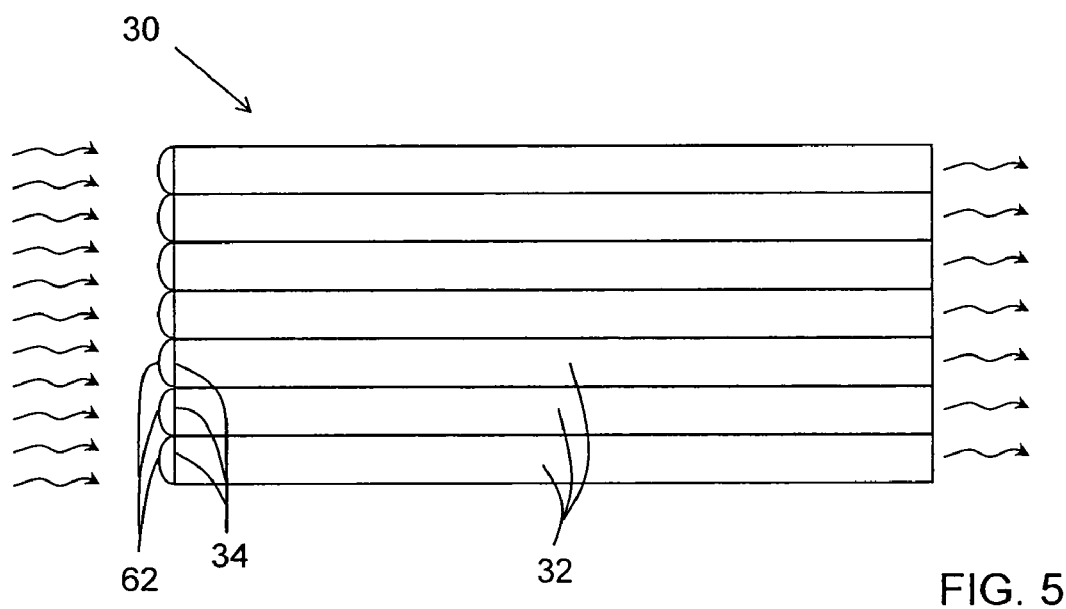
FIG. 5 is a side schematic view of an optical fiber bundle including lensed fibers according to another embodiment of the present invention.

As shown in side view in FIG. 4, a lens array 60 may be coupled to the input ends 34 of the polarization-maintaining ultraviolet transmitting optical fibers 32 of the bundle 30. The lens array may be a molded array of lenses, as shown, or may be, for example, an array of GRIN collimators, as would be apparent to the skilled artisan. Alternatively, individual lenses may be coupled to the input ends of the polarization-maintaining ultraviolet transmitting optical fibers. For example, as shown in FIG. 5, a lens 62 may be formed on the input end of each of the polarization-maintaining ultraviolet transmitting optical fibers. Lens arrays or individual lenses may likewise be used to couple radiation out of the output ends of the polarization-maintaining ultraviolet transmitting optical fibers.

Figure 6:
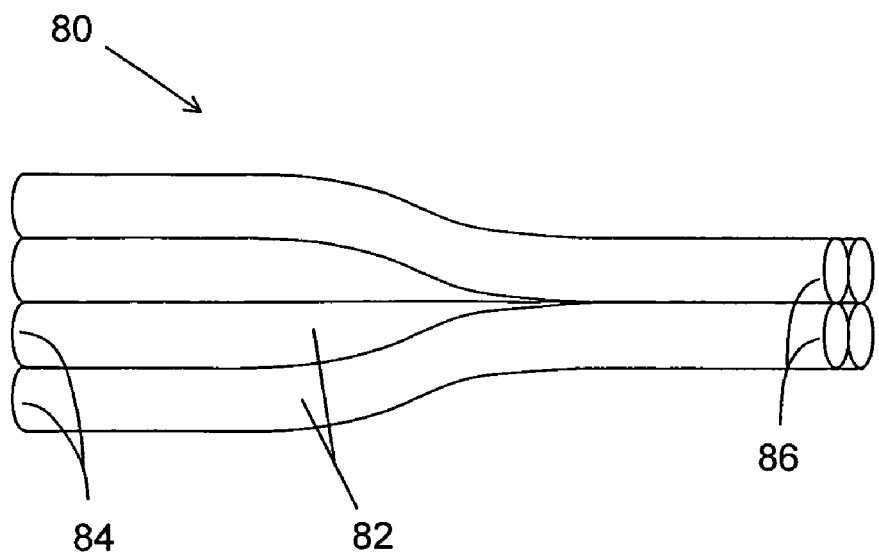
FIG. 6 is a side schematic view of an optical fiber bundle having different input and output geometries according to another embodiment of the present invention.

The bundle of polarization-maintaining ultraviolet transmitting optical fibers may be reshaped in between the input ends of the fibers and the output ends of the fibers, so that the first arrangement differs in geometry from the second arrangement. The arrangement of the bundle at the input end can be shaped to match the ultraviolet source, while the arrangement at the output end can be shaped to match a workpiece or an optical system, or to meet the requirements of an instrument or process. For example, as shown in FIG. 6, a bundle 80 can have a linear geometry at the input ends 84 of the polarization-maintaining ultraviolet transmitting optical fibers 82, and a square geometry at the output ends 86 of the polarization-maintaining ultraviolet transmitting optical fibers 82.

Figure 7:
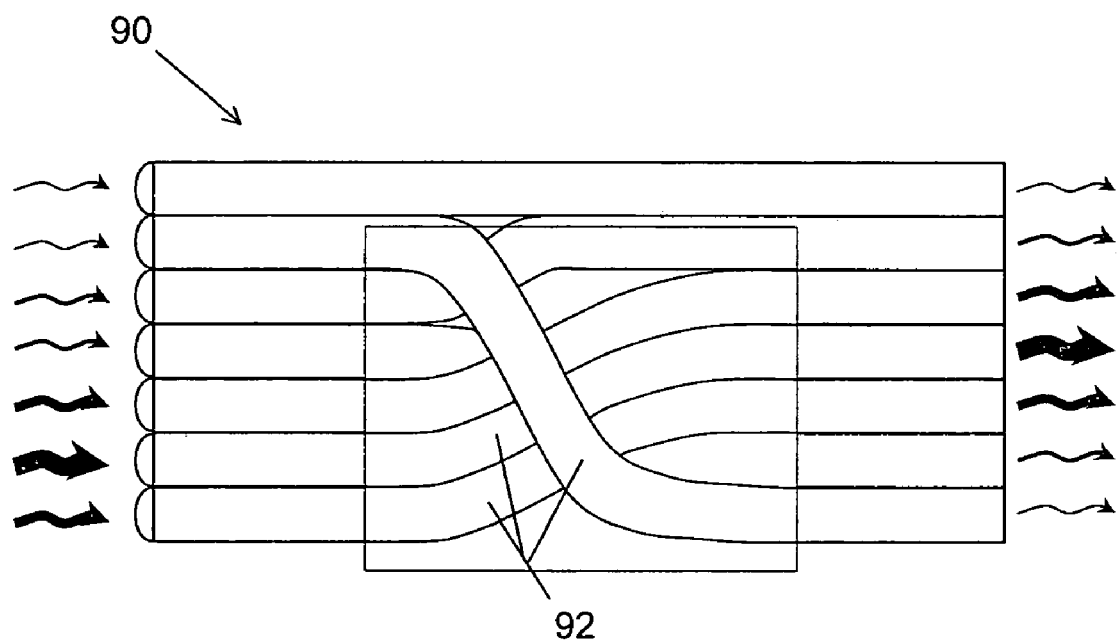
FIG. 7 is a side schematic view of an optical fiber bundle in which the fibers have been routed to change the beam intensity distribution according to another embodiment of the present invention.

The bundle of polarization maintaining ultraviolet transmitting fibers may be constructed to provide a desired beam intensity profile at its output from a different beam intensity profile at its input. For example, the fibers may be routed within the bundle so that when a beam having an input intensity profile is input to the optical fiber bundle, the optical fiber bundle outputs a beam having an output intensity profile different than the input intensity profile. For example, as shown in two dimensions in FIG. 7, a fiber bundle 90 has the same geometry at its input and output ends, but the individual polarization-maintaining ultraviolet transmitting optical fibers 92 have been routed within the bundle to provide a desired symmetrical intensity beam output from an unsymmetrical intensity input beam.

In some embodiments of the invention, it may be desirable for the polarization-maintaining ultraviolet transmitting optical fibers of the bundle to not be of substantially uniform length. For example, transmitting pulsed ultraviolet radiation, using polarization-maintaining ultraviolet transmitting optical fibers of substantially different length will serve to increase the effective length pulses emitted from the output of the bundle. Use of different lengths of fiber can also reduce the overall coherence of the transmitted ultraviolet radiation. The coherence of the transmitted radiation may be further reduced by moving (e.g., vibrating or 'jiggling') one or more of the polarization-maintaining ultraviolet transmitting optical fibers during the transmission of the ultraviolet radiation.

Figure 8:
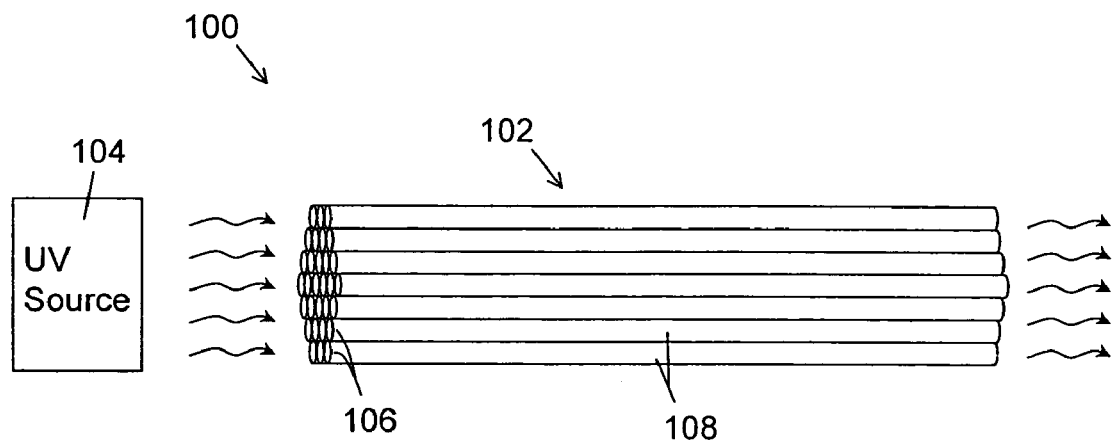
FIG. 8 is a side schematic view of an ultraviolet beam delivery unit according to another embodiment of the present invention.

An ultraviolet beam delivery unit according to another embodiment of the invention is shown in schematic side view in FIG. 8. The ultraviolet beam delivery unit 100 includes an optical fiber bundle 102 substantially as described herein, and a source 104 of a beam of plane polarized ultraviolet radiation. The source 104 is coupled to the input ends 106 of the polarization-maintaining ultraviolet transmitting optical fibers 108.

In desirable embodiments of the invention, the polarization-maintaining ultraviolet transmitting optical fibers have good transmission properties at at least one wavelength selected from the group consisting of about 157 nm, about 193 nm, about 244 nm, about 248 nm, about 266 nm, about 351 nm, and about 355 nm. As such, the source 104 of the ultraviolet beam delivery unit 100 of FIG. 8 desirably operates at a wavelength selected from the group consisting of about 157 nm, about 193 nm, about 244 nm, about 248 nm, about 266 nm, about 351 nm, and about 355 nm. In certain especially desirable embodiments of the invention, the polarization-maintaining ultraviolet transmitting optical fibers have good transmission properties at at least one wavelength selected from the group consisting of about 157 nm, about 193 nm and about 248 nm. As such, in especially desirable embodiments of the ultraviolet beam delivery unit of the present invention, the source operates at a wavelength selected from the group consisting of about 157 nm, about 193 nm and about 248 nm. The source can be, for example, an excimer laser.

Figure 9:
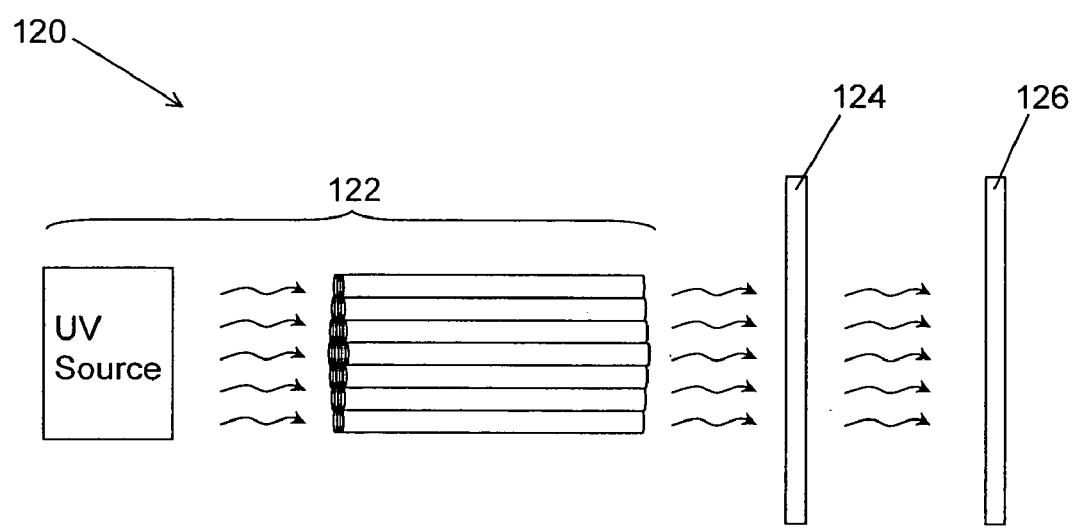
FIG. 9 is a side schematic view of a photolithography apparatus according to another embodiment of the present invention.

A photolithography apparatus according to another embodiment of the present invention is shown in schematic view in FIG. 9. The photolithography apparatus 120 includes an ultraviolet beam delivery unit 122 as described herein, a mask holder 124 configured to hold a photolithography mask, and a substrate holder 126 configured to hold a photolithography substrate so that the beam output from the ultraviolet beam delivery unit goes through the photolithography mask and strikes the photolithography substrate with its electric field vector substantially parallel to the photolithography substrate.

Figure 10:
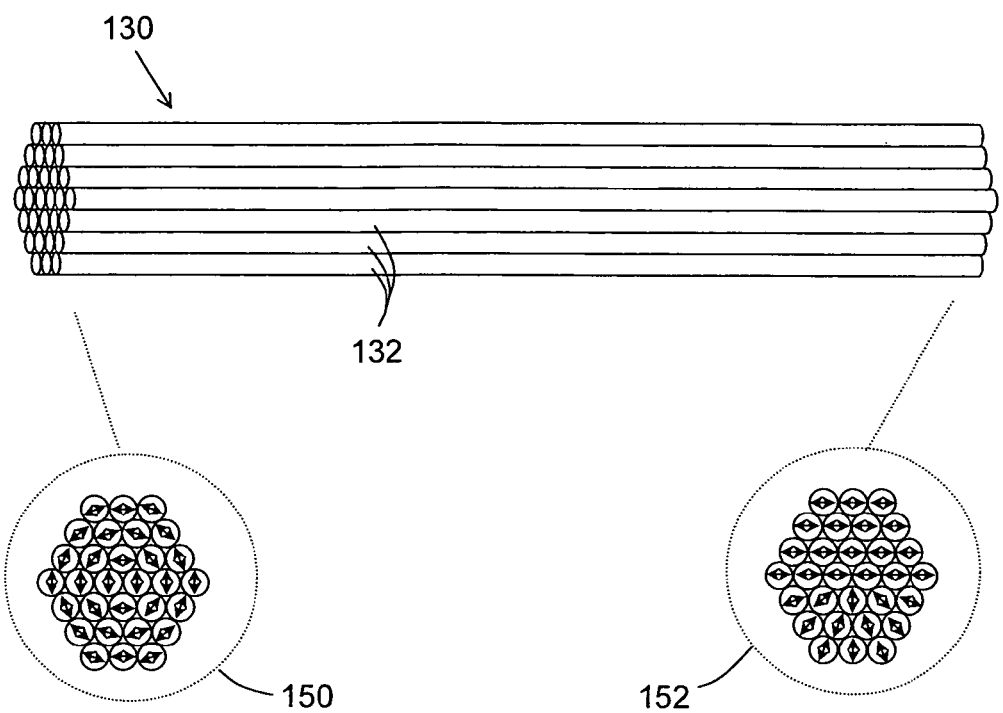
FIG. 10 is a side schematic view of an optical fiber bundle according to another embodiment of the present invention.
Figure 11:
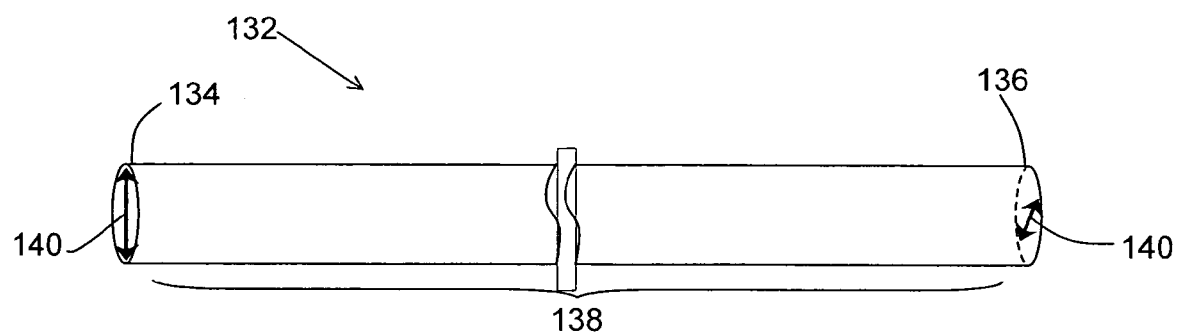
FIG. 11 is a side schematic view of a polarization-maintaining optical fiber suitable for use in the present invention.

Another embodiment of the present invention is shown in schematic side view in FIG. 10. Bundle 130 includes a plurality of polarization-maintaining ultraviolet transmitting optical fibers 132. As shown in FIG. 11, each polarization-maintaining ultraviolet transmitting optical fiber 132 has an input end 134, an output end 136, and an interior portion 138 connecting the input end to the output end. Each polarization-maintaining ultraviolet transmitting optical fiber 132 also has a polarization axis 140. Returning to FIG. 10, the input ends 134 are grouped in a first arrangement, and the output ends 136 are arranged in a second arrangement. The relative orientations of the polarization axes in the first arrangement is different than the relative orientation of the polarization axes in the second arrangement. For example, as shown in FIG. 10, the input ends of the polarization-maintaining optical fibers may be arranged so that their polarization axes at their input ends are in an azimuthal arrangement (shown in inset 150), and the output ends of polarization-maintaining optical fibers are arranged so that their polarization axes at their output ends are arranged in some arbitrary fashion (e.g., half radial and half parallel, as shown in inset 152). The optical fiber bundle according to the embodiment of FIG. 10 may be adapted as described above with reference to FIGS. 4-7.

According to this embodiment of the invention, the polarization-maintaining optical fibers may be polarization-maintaining ultraviolet transmitting optical fibers; however, any desirable polarization-maintaining optical fiber may be used. When polarization-maintaining ultraviolet transmitting optical fibers are used in the optical fiber bundle, the optical fiber bundle may be included in ultraviolet beam delivery units and photolithography apparati as described above with reference to FIGS. 8 and 9.

Figure 12:
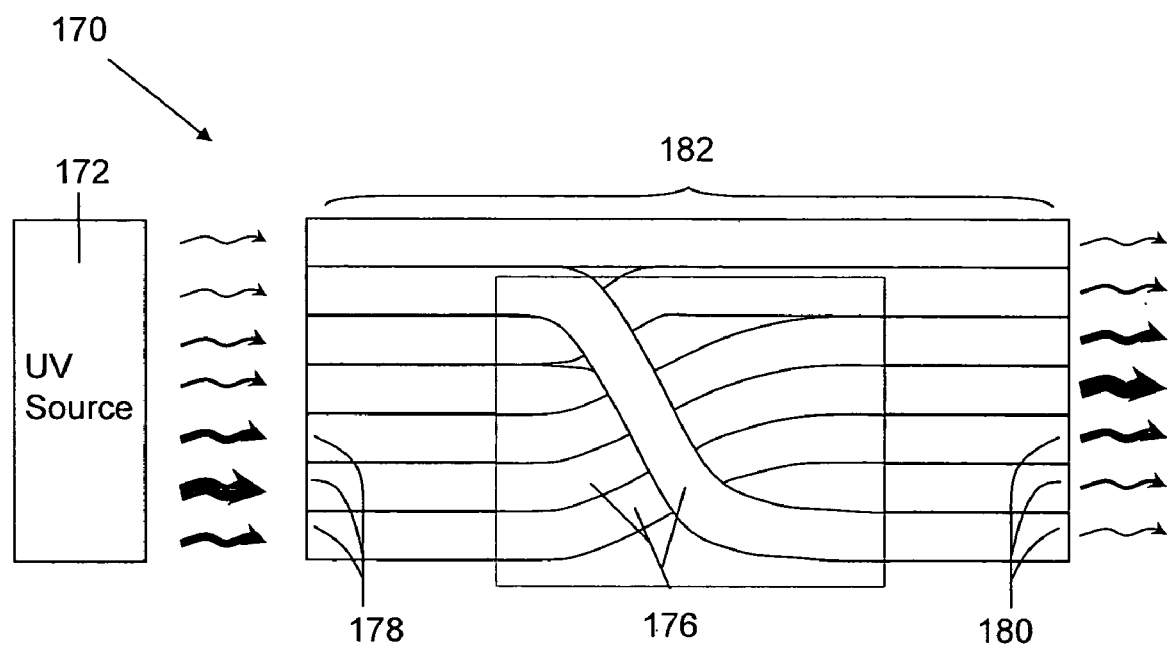
FIG. 12 is a side schematic view of ultraviolet beam delivery unit according to another embodiment of the present invention.

An ultraviolet beam delivery unit according to another embodiment of the invention is shown in schematic view in FIG. 12. Ultraviolet beam delivery unit 170 includes a source 172 of a substantially asymmetric and non-uniform in intensity beam of ultraviolet radiation; and a bundle 174 of ultraviolet transmitting optical fibers 176. Each ultraviolet transmitting optical fiber 176 has an input end 178, an output end 180, and an interior portion 182 connecting the input end to the output end. The input ends 178 are coupled to the source 172, and the ultraviolet transmitting optical fibers are routed within the bundle so that when a beam having an input intensity profile is input to the optical fiber bundle, the optical fiber bundle outputs a beam having an output intensity profile different than the input intensity profile. For example, as shown in FIG. 12, the ultraviolet transmitting optical fibers may be routed within the bundle so that the when the source 172 is switched on (i.e., produces the substantially asymmetric, substantially non-uniform beam), the ultraviolet beam delivery unit outputs radiation (from the output ends of the ultraviolet transmitting optical fibers) more symmetric in intensity than the beam output by the source. In especially desirable embodiments of the invention, the ultraviolet beam delivery unit outputs radiation that is substantially symmetrical in intensity.

In especially desirable embodiments of the invention, source 172 is an excimer laser. Excimer lasers tend to have asymmetric, non-uniform beams, which can advantageously be corrected in the ultraviolet beam delivery units according to the present embodiment of the invention.

The ultraviolet transmitting optical fibers used in this embodiment of the invention may be any optical fiber that has transmission at the desired ultraviolet wavelength that is high enough for the desired use. For example, the ultraviolet transmitting optical fibers may be hollow core photonic band gap fibers.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical fiber bundle comprising
   a plurality of polarization-maintaining ultraviolet transmitting optical fibers, each of the polarization-maintaining ultraviolet transmitting optical fibers having an input end, an output end, an interior portion connecting the input end to the output end, and a polarization axis,
   wherein the input ends of the polarization-maintaining ultraviolet transmitting optical fibers are grouped in a first arrangement, and
   the output ends of the polarization-maintaining ultraviolet transmitting optical fibers are grouped in a second arrangement, and are arranged with respect to the input ends of the polarization-maintaining ultraviolet transmitting optical fibers so that when a plane polarized beam is input to the fiber bundle at the input ends of the polarization-maintaining ultraviolet transmitting optical fibers, it is output from the output ends the polarization-maintaining ultraviolet transmitting optical fibers as a substantially azimuthally polarized beam.

2. The optical fiber bundle of claim 1, wherein the input ends of the polarization-maintaining ultraviolet transmitting optical fibers are arranged so that their polarization axes at their input ends are substantially parallel to one another, and the output ends of polarization-maintaining ultraviolet transmitting optical fibers are arranged so that their polarization axes at their output ends are arranged azimuthally.

3. The optical fiber bundle of claim 1, wherein the polarization-maintaining optical fibers are polarization-maintaining hollow core photonic band gap fibers.

4. The optical fiber bundle of claim 1 further comprising an input lens array operatively coupled to the input ends of the polarization-maintaining ultraviolet transmitting optical fibers.

5. The optical fiber bundle of claim 1 further comprising a lens coupled to each of the input ends of the polarization-maintaining ultraviolet transmitting optical fibers.

6. The optical fiber bundle of claim 1, wherein the first arrangement has a substantially different geometry than the second arrangement.

7. The optical fiber bundle of claim 1, wherein the fibers are routed within the bundle so that when a beam having an input intensity profile is input to the optical fiber bundle, the optical fiber bundle outputs a beam having an output intensity profile different than the input intensity profile.

8. The optical fiber bundle of claim 1, wherein the polarization-maintaining UV transmitting optical fibers are not of substantially uniform length.

9. The optical fiber bundle unit of claim 1, further including a fiber moving apparatus coupled to the interior portions of the polarization-maintaining ultraviolet transmitting optical fibers and configured to move the interior portions of the polarization-maintaining ultraviolet transmitting optical fibers during use of the optical fiber bundle.

10. An ultraviolet beam delivery unit for providing an azimuthally-polarized beam, the ultraviolet beam delivery unit comprising:
    the optical fiber bundle of claim 1; and
    a source of a beam of plane polarized ultraviolet radiation;
    wherein the source is coupled to the input ends of the polarization-maintaining ultraviolet transmitting optical fibers.

11. The ultraviolet beam delivery unit of claim 10, wherein the source of the beam of polarized ultraviolet radiation operates at a wavelength selected from the group consisting of about 157 nm, about 193 nm, about 244 nm, about 248 nm, about 266 nm, about 351 nm, and about 355 nm.

12. The ultraviolet beam delivery unit of claim 10, wherein the source of the beam of polarized ultraviolet radiation operates at a wavelength selected from the group consisting of about 157 nm, about 193 nm and about 248 nm.

13. A photolithography apparatus for use with a photolithography mask and a photolithography substrate, the photolithography apparatus comprising
    the ultraviolet beam delivery unit of claim 10,
    a mask holder configured to hold the photolithography mask, and
    a substrate holder configured to hold the photolithography substrate so that the beam output from the ultraviolet beam delivery unit goes through the photolithography mask and strikes the photolithography substrate with its electric field vector substantially parallel to the photolithography substrate.

14. An ultraviolet beam delivery unit for providing an azimuthally-polarized beam, the ultraviolet beam delivery unit comprising an optical fiber bundle comprising a plurality of polarization-maintaining optical fibers, each of the polarization-maintaining optical fibers having an input end, an output end, an interior portion connecting the input end to the output end, and a polarization axis wherein the input ends of the polarization-maintaining optical fibers are grouped in a first arrangement, and the output ends of the polarization-maintaining optical fibers are grouped in a second arrangement, and wherein the relative orientations of the polarization axes in the first arrangement is different than the relative orientation of the polarization axes in the second arrangement;

a source of a beam of plane polarized ultraviolet radiation;

wherein the source is coupled to the input ends of the polarization-maintaining ultraviolet transmitting optical fibers.

15. The ultraviolet beam delivery unit of claim 14, wherein the output ends of polarization-maintaining optical fibers are arranged so that their polarization axes at their output ends have a relative arrangement selected from the group consisting of azimuthally, random, radial and parallel.

16. The ultraviolet beam delivery unit of claim 14, wherein the polarization-maintaining optical fibers are polarization-maintaining ultraviolet transmitting optical fibers.

17. A photolithography apparatus for use with a photolithography mask and a photolithography substrate, the photolithography apparatus comprising the ultraviolet beam delivery unit of claim 14, a mask holder configured to hold the photolithography mask, and a substrate holder configured to hold the photolithography substrate so that the beam output from the ultraviolet beam delivery unit goes through the photolithography mask and strikes the photolithography substrate with its electric field vector substantially parallel to the photolithography substrate.

* * * * *